United States Patent [19]

Kathirgamanthan et al.

[11] Patent Number: 4,956,441
[45] Date of Patent: Sep. 11, 1990

[54] ELECTROCONDUCTIVE COPOLYMERS

[75] Inventors: Poopathy Kathirgamanthan, North Harrow; Philip N. Adams, London, both of United Kingdom; Kieran Quill, Douglas, Ireland; Alan E. Underhill, Bangor, United Kingdom

[73] Assignee: Cookson Group PLC, United Kingdom

[21] Appl. No.: 222,779

[22] Filed: Jul. 22, 1988

[30] Foreign Application Priority Data

Jul. 23, 1987 [GB] United Kingdom ............... 8717458

[51] Int. Cl.$^5$ .................. C08G 59/00; C08F 8/00
[52] U.S. Cl. ............................. 528/171; 528/86; 525/326.1
[58] Field of Search ............ 525/326.1; 528/171, 528/86

[56] References Cited

U.S. PATENT DOCUMENTS

| | | | |
|---|---|---|---|
| 4,404,354 | 9/1983 | Takukitamura | 528/86 |
| 4,473,676 | 9/1984 | Steklenski | 524/32 |
| 4,615,829 | 10/1986 | Tamura et al. | 528/422 |
| 4,731,408 | 3/1988 | Jasne | 524/516 |

FOREIGN PATENT DOCUMENTS

| | | |
|---|---|---|
| 2124635 | 2/1984 | United Kingdom . |
| 2151242 | 7/1985 | United Kingdom . |
| 2169608 | 7/1986 | United Kingdom . |
| 2184738 | 7/1987 | United Kingdom . |

Primary Examiner—John Kight, III
Assistant Examiner—P. Hampton-Hightower
Attorney, Agent, or Firm—Watson, Cole, Grindle & Watson

[57] ABSTRACT

A copolymer of an aniline monomer of the general formula:

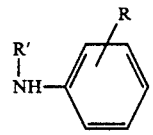

where R and R' are certain specified substituents with another aniline monomer of formula I, the copolymer including counterions X therein. These copolymers are electroconductive.

6 Claims, No Drawings

ELECTROCONDUCTIVE COPOLYMERS

The present invention relates to copolymers which are formed by the copolymerisation of a substituted aniline with aniline or another substituted aniline.

Polymers of aniline have been known for many years, thus more than a century ago it was reported in Journal of the Chemical Society, 15, 161, (1862), that the final product of the anodic oxidation of aniline in aqueous sulphuric acid solution at a platinium electrode was a dark green precipitate which was termed "aniline black" by subsequent workers in the field. Similar results were also obtained for the anodic oxidation of hydrochloric acid solutions of aniline. The chemical oxidative polymerization of aniline with either $H_2O_2$ or $VCl_3$ was reported in Journal of the Chemical Society, 101, 1117, (1912). The principal product of this chemical polymerization/oxidation is a linear octamer which is known as emeraldine.

More recently, an aniline polymer having as a main repeating unit thereof a quinonediimine structure has been described in British Pat. No. 2151242. Other workers have also described aniline homopolymers and reference is made to British Pats. Nos. 2169608 and 2124635.

A copolymer of aniline with a pyrrole or a substituted pyrrole is described in British Pat. No. 2184738.

We have now developed co-polymers of aniline or a substituted aniline in which the co-monomer is a substituted aniline.

Accordingly, the present invention provides a co-polymer of an aniline monomer of the general formula:

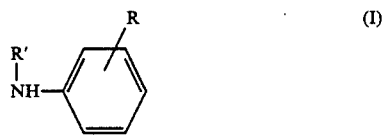

where
R is in the ortho- or meta- position and is hydrogen, $C_{1-18}$ alkyl, $C_{1-6}$ alkoxy, amino, chloro, bromo, sulpho, carboxy, hydroxy or the group

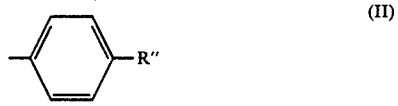

where
R" is alkyl or aryl; and
R' is hydrogen, $C_{1-6}$ alkyl or aryl; with at least one other aniline monomer of formula I as defined above, the copolymer including counterions X where X is $Cl^-$, $Br^-$, $SO_4^=$ $BF_4^-$, $PF_6^-$, $H_2PO_3^-$, $H_2PO_4^-$, arylsulphonate, arenedicarboxylate, arenecarboxylate, polystyrene sulphonate, polyacrylate, alkylsulphonate, vinylsulphonate, vinylbenzene sulphonate, cellulose sulphonate, cellulose sulphate or a perfluorinated polyanion.

Examples of arylsulphonates are p-toluenesulphonate, benzenesulphonate, 9,10-anthraquinonesulphonate and anthracenesulphonate, an example of an arenedicarboxylate is phthalate, whilst an example of an arenecarboxylate is benzoate.

Preferred copolymers are the copolymers of aniline with o-anisidine, m-sulphanilic acid or o-aminophenol; or o-toluidine with o-aminophenol, o-ethylaniline or o-phenylenediamine.

The co-polymerisation may be carried out by oxidising the aniline monomer of Formula (I) in the presence of at least one co-monomer which is another monomer of Formula (I) with an oxidant which has a higher oxidation potential than the aniline monomer or the co-monomer either in the presence of an acid HX to provide counterions X, or with the sequential addition of an acid HX to the oxidised monomer in order to provide counterions X. The reaction is preferably carried out in aqueous solution.

The concentration of oxidant is preferably in the range of from 0.5 to 3 times the concentration of the aniline monomer or the co-monomer. The concentration of the acid HX is preferably in the range of from 0.5 to 4 molar. The reaction is preferably carried out at a temperature of below 40°C., more preferably at a temperature in the range of from 0° to 40°C.

Suitable oxidants are ammonium persulphate, potassium dichromate, hydrogen peroxide and sodium chlorate.

The co-polymers may also be prepared electrochemically under a variety of conditions. The electrodes at which co-polymerisation occurs are normally made from platinum, graphite, tungsten, titanium, niobium, nickel, lead or indium-tin oxide.

The anions for the electrochemical co-polymerisation are any of the counterions defined in relation to X.

The electrochemical co-polymerisation may be carried out in a solvent such as acetonitrile, dichloromethane, chloroform, nitromethane, nitrobenzene, propylene carbonate, N-methylpyrrolidone, sulpholane, dimethylformamide, dimethylsulphoxide or trichlorobenzene. The polymerization in a solvent is preferably carried out in the presence of a proton abstractor, such as pyridine. Alternatively, the electrochemical polymerization may be carried out in aqueous medium, preferably aqueous acidic medium, although neutral or basic conditions may also be used.

The co-polymers of the present invention are conductive and are therefore useful in thin film technology, as EMI/RF shielding materials, as antistatic materials, in electrochromic display systems, as ion and pH sensors, as battery electrode materials, as protective coatings for electrodes and as electrodes for the selective deposition of metal ions.

The present invention will be further described with reference to the following Examples.

EXAMPLE 1

Synthesis of poly[(m-sulphanilic acid)(aniline)]-p-toluenesulphonate co-polymer

Poly(m-sulphanilic acid) was found to be so water soluble that it could not be conveniently isolated. A co-polymer composed of m-sulphanilic acid and aniline was isolable, while retaining the high conductivity of poly(aniline) and the high solubility of poly(m-sulphanilic acid).

Details of various preparations of the co-polymer are given in Table 1 below.

TABLE 1

| Aniline (mol) | m-sulphanilic acid (mol) | Oxidant $(NH_4)_2S_2O_8$ (mol) | p-toluene sulphonic acid (mol) | $\sigma$volume/ S cm$^{-1}$ | Comments |
|---|---|---|---|---|---|
| 0.05 | 0.05 | 0.15 in 100 ml of water | 0 | $1.9 \times 10^{-4}$ | Product soluble in water, conductivity of the reconstituted film = $1 \times 10^{-5}$ S☐ |
| 0.025 | 0.025 | 0.075 in 50 ml of water | 0.05 in 25 ml of water | $5 \times 10^{-2}$ | Product soluble in water |
| 0.05 | 0.10 | 0.225 in 150 ml of water | 0 | $3.4 \times 10^{-5}$ | Product soluble in water |
| 0.017 | 0.033 | 0.075 in 40 ml of water | 0.05 in 25 ml of water | $7 \times 10^{-2}$ | Product soluble in water |

EXAMPLE 2

Synthesis of poly[(aniline)(o-anisidine)]chloride co-polymer (initial molar ratio aniline:o-anisidine of 1:1)

Aniline ($4.6 \times 10^{-3}$ mol) and o-anisidine ($4.6 \times 10^{-3}$ mol) were dissolved in 1M HCl (90 ml) and the solution was cooled to 2° C. in an ice/water bath for ½ hour. Ammonium persulphate ($13.8 \times 10^{-3}$ mol) in 10 ml of 1M HCl was added dropwise to the stirred cooled solution. After ½ hour, a dark blue-green precipitate was formed. The mixture was stirred for another 1½ hours at 2° C. and filtered at suction, washed with several portions of 1M HCl (100 ml) until the filtrate was almost colourless. The blue-green product was dried in a vacuum oven at 40° C. for 24 hours. $\sigma^{volume} = 1.1 \times 10^{-1}$ S cm$^{-1}$ (disc).

EXAMPLE 3

Synthesis of poly[(aniline)(o-anisidine)]chloride co-polymer (initial molar ratio aniline:o-anisidine of 3:1)

The procedure was similar to that of Example 2, but the starting ratio of aniline to o-anisidine was 1:3. The co-polymer obtained had a $\sigma^{volume} = 3.3 \times 10^{-2}$ S cm$^{-1}$ (disc).

EXAMPLE 4

Synthesis of poly[(aniline)(o-anisidine)]chloride co-polymer (initial molar ratio aniline:o-anisidine of 7:1)

The procedure was similar to that of Example 2, but the starting ratio of aniline to o-anisidine was 7:1. The copolymer obtained had a $\sigma^{volume} = 3.63 \times 10^{-1}$ S cm$^{-1}$ (disc).

EXAMPLE 5

Synthesis of poly[(aniline)(o-anisidine)]p-toluenesulphonate co-polymer

Aniline (0.14 moles) and o-anisidine (0.02 moles) were added to 0.16 moles of p-toluenesulphonic acid (150 ml). A white precipitate was formed. Ammonium persulphate (0.16 moles in 130 ml of water) was added slowly thereto with vigorous stirring. After 5 minutes, the mixture thickened considerably and the stirring was continued for a further 3 hours before filtering, washing with water and drying overnight at 100° C. in vacuo. The black powder obtained (17.2 g) had a volume conductivity of 0.29 S cm$^{-1}$.

EXAMPLE 6

Synthesis of poly[(o-toluidine)(o-ethylaniline)]p-toluenesulphonate co-polymer (initial molar ratio 1:1)

5.4g of o-toluidine (0.05 moles) and 6.1g of o-ethylaniline (0.05 moles) were added to a 100 ml solution containing p-toluene sulphonic acid (19.0g) with vigorous stirring. Addition of ammonium persulphate (22.8g in 80 ml of water) broke up the coffee coloured precipitate and the solution darkened in colour. After stirring for a further 1.5 hours, the reaction mixture was filtered at suction, washed with water and dried in vacuo at 90° C.

The dark brown-black powder obtained (11.35)g had a volume conductivity of $1.2 \times 10^{-4}$ S cm$^{-1}$.

The co-polymer was soluble in N-methylpyrrolidone (0.1g in 100g of N-methylpyrrolidone) and produced a dark blue solution. At a 1% level, it produced a turquoise suspension and at a 5% level, a dark green suspension. The volume conductivity of a cast film of 10μ thickness was $2.4 \times 10^{-2}$ S cm$^{-1}$. Green transparent films (transmission 10–20%) with surface conductivities $10^{-7}$ to $10^{-6}$ S ☐ were readily obtained. The co-polymer was found to be easier to solvent cast than its constituent homopolymers.

EXAMPLE 7

Synthesis of poly[(o-aminophenol)(aniline)] p-toluene sulphonate co-polymer 1.09g of o-aminophenol was dissolved in p-toluenesulphonic acid solution (22.83g in 100 ml) and 9.31g of aniline was added thereto. A dense white precipitate was formed. This was mechanically stirred with the slow addition of ammonium persulphate (25.1g in 100 ml), whereupon the precipitate redissolved and the solution turned dark brown. The solution was then heated to 50° C. and after stirring for a further 10 minutes, the mixture thickened to give a muddy green suspension. The suspension was stirred for a further three hours before it was filtered, washed with water and dried in vacuo at 90° C. for 12 hours. The green powder obtained (9.7g) had a volume conductivity of $9 \times 10^{-2}$ S cm$^{-1}$.

EXAMPLE 8

Synthesis of poly[(o-aminophenol)(o-toluidine)]p-toluene sulphonate co-polymer (initial ratio of 1:1)

5.46g of o-aminophenol was added to a p-toluenesulphonic acid solution (22.83 g in 100 ml of water) and a fine pink precipitate was obtained. o-Toluidine (5.36g) was added thereto with vigorous mechanical stirring. The solution was warmed up to 50° C. for a few minutes, then 22.82 g of ammonium persulfate in 80 ml of water were added dropwise to the solution, and the solution was then stirred for a further 3 hours before it was filtered, washed with water and dried in vacuo at 90° C. for 12 hours. The brown powder obtained (6.5 g) had a volume conductivity of $1 \times 10^{-8}$ S cm$^{-1}$.

EXAMPLE 9

Synthesis of poly[(o-phenylenediamine)(o-toluidine)] p-toluenesulphonate co-polymer o-Phenylenediamine (5.41g) and o-toluidine (5.36g) were added to a p-toluenesulphonic acid solution (28.53g) in 100 ml of water) with vigorous mechanical stirring. The solution was then warmed up to 50° C. for a few minutes, then 22.82 g of ammonium persulfate in 80 ml of water were added dropwise to the solution, and then the stirring was continued for a further 3 hours before it was filtered, washed with water and dried in vacuo at 90° C. for 12 hours. The blue-black powder obtained (4.7 g) had a volume conductivity of $6 \times 10^{-6}$ S cm$^{-1}$.

EXAMPLE 10

Synthesis of Poly[(o-toluidine)(o-ethylaniline)(o-aminophenol)]p-toluenesulphonate co-polymer o-Toluidine (1.11 g), o-ethylaniline (1.21 g) and o-aminophenol (1.1 g) were added to a p-toluenesulphonic acid solution (5.7 g in 30 ml of water) with vigorous magnetic stirring. On addition of ammonium persulphate thereto (6.9 g in 20 ml of water), the solution turned brown. The solution was then warmed up to 50° C. for a few minutes and stirred for a further period of 3 hours before it was filtered, washed with water and dried in vacuo for 12 hours at 90° C. The blue black powder obtained (2.6 g) had a volume conductivity of $1 \times 10^{-9}$ S cm$^{-1}$.

We claim:

1. A copolymer of an aniline monomer of the general formula:

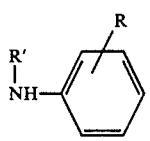
(I)

where

R is in the ortho- or meta- position and is selected from the group consisting of hydrogen, C$_{1-18}$ alkyl, C$_{1-6}$ alkoxy, amino, chloro, bromo, sulpho, carboxy, hydroxy and the group

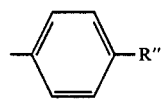
(II)

where

R" is selected from the group consisting of alkyl and aryl; and

R' is selected from the group consisting of hydrogen, C$_{1-6}$ alkyl and aryl; with at least one other aniline monomer of formula I as defined above, the copolymer including counterions X where X is selected from the group consisting of Cl$^-$, Br$^-$, SO$_4^=$, BF$_4^=$, PF$_6^=$, H$_2$PO$_3^-$, H$_2$PO$_4^-$, arylsulphonate, arenedicarboxylate, arenecarboxylate, polystyrene sulphonate, polyacrylate, alkylsulphonate, vinylsulphonate, vinylbenzene sulphonate, cellulose sulphonate, cellulose sulphate and a perfluorinated polyanion.

2. Copolymer according to in claim 1 which is a copolymer of an aniline monomer of the general formula I with aniline.

3. Copolymer according to claim 1 which is a copolymer of aniline with a comonomer selected from the group consisting of o-anisidine, m-sulphanilic acid and o-aminophenol.

4. Copolymer according to claim 1 which is a copolymer of o-toluidine with a comonomer selected from the group consisting of o-ethylaniline, o-phenylenediamine and o-aminophenol.

5. A polyaniline derivative according to claim 1 for a use selected from an EMI/RF shielding material, an antistatic material, an electrochromic display system material, an ion or pH sensor, a battery electrode material, a protective coating for an electrode or an electrode for the selective deposition of metal ions.

6. A copolymer of an aniline monomer of the general formula:

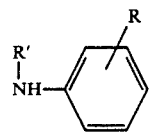
(I)

where

R is in the ortho- or meta- position and is selected from the group consisting of hydrogen, C$_{1-18}$ alkyl, C$_{1-6}$ alkoxy, amino, chloro, bromo, sulpho, carboxy, hydroxy and the group

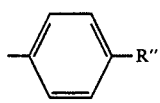
(II)

where

R" is selected from the group consisting of alkyl and aryl; and

R' is selected from the group consisting of hydrogen, C$_{1-6}$ alkyl and aryl; with at least one other aniline monomer of formula I as defined above, the copolymer including organosulphonate counterions.

* * * * *